United States Patent [19]

Kehrer et al.

[11] 4,303,735

[45] Dec. 1, 1981

[54] BASE MEMBER COATED WITH AN ELECTRICALLY CONDUCTIVE SILICONE ELASTOMER

[75] Inventors: Gerald P. Kehrer, Auburn, Mich.; William G. Smith, St. Charles, Ill.

[73] Assignee: Dow Corning Corporation, Midland, Mich.

[21] Appl. No.: 183,258

[22] Filed: Sep. 2, 1980

Related U.S. Application Data

[62] Division of Ser. No. 27,188, Apr. 4, 1979.

[51] Int. Cl.³ .......................... B32B 9/04; D02G 3/00; H01B 7/00
[52] U.S. Cl. .................... 428/391; 174/120 SC; 428/289; 428/367; 428/368; 428/392; 428/395; 428/429; 428/447
[58] Field of Search ............... 428/391, 392, 375, 378, 428/367, 368, 447, 429, 289, 395; 252/511; 174/120 SC, 120 SR, 120 AR

[56] References Cited

U.S. PATENT DOCUMENTS

| | | | |
|---|---|---|---|
| 3,284,751 | 11/1966 | Barker et al. | |
| 3,385,959 | 5/1968 | Ames et al. | 252/511 X |
| 3,406,126 | 10/1968 | Litant | 252/511 |
| 3,425,967 | 2/1969 | Modic | 260/37 SB |
| 3,629,154 | 12/1971 | Johnson | 252/511 |
| 3,697,473 | 10/1972 | Polmanteer et al. | 528/15 X |
| 3,706,695 | 12/1972 | Huebner | 260/37 SB |
| 3,989,668 | 11/1976 | Lee et al. | 528/31 X |
| 4,020,014 | 4/1977 | Service et al. | 252/511 |
| 4,051,454 | 9/1977 | Leiser et al. | 252/511 X |
| 4,064,074 | 12/1977 | Ellis | 252/506 |
| 4,076,652 | 2/1978 | Ganci et al. | |
| 4,087,585 | 5/1978 | Schulz | 428/429 |
| 4,145,317 | 3/1979 | Sado et al. | 252/511 X |
| 4,163,081 | 7/1979 | Schulz | 428/429 |

FOREIGN PATENT DOCUMENTS 50-89464 7/1975 Japan.
51-24300 7/1976 Japan.

*Primary Examiner*—Lorraine T. Kendell
*Attorney, Agent, or Firm*—Roger H. Borrousch; Edward C. Elliott

[57] ABSTRACT

It has been discovered that the addition of a small amount (less than 5 percent by weight) of chopped graphite fibers to an electrically conductive silicone elastomeric mixture increases the electrical conductivity to an unexpected degree. The electrically conductive silicone elastomeric mixture can be coated on a base member and cured to yield an electrically conductive device.

An application of the technology is the manufacture of conductive core for use in automotive ignition cable. By using this electrically conductive silicone elastomeric mixture it is no longer necessary that the base member itself be conductive.

6 Claims, No Drawings

BASE MEMBER COATED WITH AN ELECTRICALLY CONDUCTIVE SILICONE ELASTOMER

This application is a division of application Ser. No. 27,188, filed Apr. 4, 1979.

BACKGROUND OF THE INVENTION

1. Field of the Invention

This invention relates to improvements in the electrical conductivity of cured silicone elastomers produced from silicone elastomer compositions.

2. Description of the Prior Art

Compositions comprising elastomeric materials filled with electrically conducting particles are well known in the art. The particles have been described as metallic particles, carbon black, colloidal graphite particles, and metallic coated particles. Many types of elastomeric materials have been described including silicone elastomers. Japanese Patent Publication No. 24,300 published July 23, 1976 by Yoshita and Takeachi describes a composition which can be vulcanized under standard pressure consisting of diorganopolysiloxane, 0.1 to 100 parts of carbon fiber, and 3 to 10 parts of 2-4-dichlorobenzoylperoxide. The patent teaches that carbon blacks such as acetylene black are not allowed. The patent further teaches that a procedure employing a platinum catalyst for vulcanization is not satisfactory. Ellis, in U.S. Pat. No. 4,064,074, claims a process for the preparation of an electrically conductive coating composition comprising a particulate component and a vehicle. Among many suggested vehicles or binders is silicones, further defined as silicone resin or silicone rubber. The particulate component is a blend of 60 to 90 percent graphite, 1.5 to 20 percent manganese dioxide, and 0.5 to 20 percent zinc oxide. The electrically conductive coating composition is used in the manner of a paint.

In U.S. Pat. No. 3,284,751 Barker et al. describe an ignition cable for use with automotive vehicles comprising a flexible resistive conductor for nonconducting fibers coated with conducting material of discrete particles, a conductive rubber coating bonding together the fibers of said conductor, and other additional layers. The composition of the instant invention is an improvement over presently known commercially conductive rubber coatings. These coatings, as described by Barker, et al. are solvent solutions which are applied by dipping, drying, and curing. Such a process requires large amounts of energy for the drying step. The solvent also causes a problem in its proper ecological disposal. A preferred embodiment of the instant invention uses no solvent, thereby lowering the energy requirement and also eliminating the disposal problem.

The Barker et al. process entails the coating of a layer of conducting substance over said rubber coating to act as a release agent for subsequent layers. This coating, consisting of a colloidal solution of graphite in alcohol, must be dipped and dryed. An electrically conductive member produced according to the instant invention does not require such a coating when used in an ignition cable since the surface of the electrically conductive member is a good release surface for insulation applied over it.

Barker et al. further describes the construction of a prior art nonmetallic conductor. Individual threadlike filaments, of cotton, rayon, linen, polyester, or glass, or mixtures of the various filaments are impregnated with conductive material, such as graphite. The individual threads are immersed in a colloidal solution of graphite in alcohol so as to completely impregnate the individual fibers of the threads. Upon issuing from the graphite solution, the threads are gathered together in a suitable mechanical means and carried into a drying oven as a group so that they are dried together in contact with each other which deposits the graphite as discrete particles on the threads. The resistance of the final conductor is in part determined by the number of threads used and in part by subsequent conductor components.

The construction of the electrical conductive member of the instant invention can be much simpler and cheaper than that taught by Barker et al. The electrical conductivity of the composition of the instant invention can be high enough to allow the use of electrically nonconducting filaments. The above described step by Barker et al. for making the filaments conductive can be completely eliminated from the process.

SUMMARY OF THE INVENTION

The addition of a small amount (less than 5%) of chopped graphite fibers to an electrically conductive low viscosity curable silicone elastomeric mixture improves the conductivity of cured electrically conductive silicone elastomer to an unexpected degree. When the composition is used to manufacture a conductive core for use in automotive ignition cable, it is no longer necessary to use a conductive form of fiber as the base member of the core.

DESCRIPTION OF THE INVENTION

This invention relates to a silicone composition curable to an electrically conductive silicone elastomer comprising a product obtained by mixing (A) an electrically conductive curable silicone elastomeric mixture having a viscosity below 1,000 Pa.s at 25° C. and (B) graphite fibers with an average length of from about 1 mm to about 6 mm, the graphite fibers being present in an amount of from 0.3% to 5.0% by weight based on the weight of the composition.

The graphite fibers used in this invention are commercial materials. They are commonly produced by the carbonization of organic fibers to produce carbon fibers or graphite fibers depending upon the processes used. The term graphite as used hereafter includes both the graphite and carbon allotropes. The fibers are most commonly used as high modulus, high strength reinforcing agents for a variety of plastic based engineering materials. The graphite fibers are used in combination with glass fibers to produce yarns which can be woven into fabrics which exhibit electrical conductivity. Woven tapes or graphite fibers are used as reinforcements in high temperature applications as well as for resistance heating elements. For use in this invention the graphite fibers are chopped into short lengths for mixing into the electrically conductive curable silicone elastomeric mixture. The fibers are chopped as uniformly as practical into lengths of from 1 mm to 6 mm. If the individual fiber lengths are too long, the coating produced by the composition will be rough and nonuniform on the surface. If the fibers are too short, significant improvement in electrical conductivity is not observed. The preferred average length of the chopped fiber is about 3.2 mm.

Since commercial carbon and graphite fibers are used to reinforce plastics they sometimes are finished on their surface with a coupling agent to provide better strengths. The fiber used in this invention should not be finished with any coupling agent that will interfere with the cure of the silicone elastomeric mixture. Simple experimentation will establish if the fiber chosen interferes with the cure of the silicone elastomeric mixture used.

The electrically conductive, curable, silicone elastomeric mixture used in this invention can be any mixture capable of being further mixed with the graphite fibers and cured to an electrically conductive silicone elastomer. The mixture can be cured by conventional means for curing silicone compositions, such as with organic peroxides, radiation, or through the platinum catalyzed reaction between aliphatically unsaturated groups on silicon with silicon-bonded hydrogen atoms. The mixture has a viscosity of below 1000 poise at 25° C. so that the graphite fibers can be uniformly dispersed throughout the mix without destroying the fibers. If excessive shear is used to prepare the more viscous silicone mixtures, the graphite fibers will be broken into lengths too short to provide satisfactory improvement in electrical conductivity. A viscosity of below 1000 poise at 25° C. also allows the mixture to be pumped so that it can be easily fed to coating devices.

A solvent can be used to reduce the viscosity for preparation of the mixtures. If this is done the energy saved by a non-solvent system is lost. The significant improvement in electrical conductivity due to the addition of the graphite fibers is still retained.

A preferred type of electrically conductive curable silicone elastomeric mixture comprises (i) 100 parts by weight of a vinyldiorganosiloxy endblocked polydiorganosiloxane fluid wherein each organic radical is selected from a group consisting of methyl, ethyl, phenyl, and 3,3,3-trifluoropropyl radicals, there being from 0 to 50 inclusive percent 3,3,3-trifluoropropyl radicals and from 0 to 10 inclusive phenyl radicals both based on the total number of organic radicals in the polydiorganosiloxane fluid, the fluid having a viscosity of from 0.2 to 100 Pa.s measured at 25° C., (ii) from 15 to 60 parts by weight of electrically conductive carbonaceous particles selected from a group consisting of carbon and graphite particles having an average particle diameter of less than 20 micrometers, (iii) a polyorganohydrogensiloxane having an average of at least 2.1 silicon-bonded hydrogen atoms per molecule, no silicon atom having bonded thereto more than one slicon-bonded hydrogen atom, said molecules consisting essentially of units selected from the group consisting of H(CH$_3$)SiO units, R$_2$SiO units, H(CH$_3$)$_2$SiO$_{\frac{1}{2}}$ units, R$_3$SiO$_{\frac{1}{2}}$ units, and SiO$_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the polydiorganosiloxane fluid (i), (iv) a platinum catalyst, soluble in (i) and present in an amount sufficient to provide at least 1 part by weight of platinum for every one million parts by weight of the polydiorganosiloxane fluid (i), and (v) an amount of a platinum catalyst inhibitor sufficient to give the desired shelf life after mixing. Such mixtures are commercially available.

The vinyl-containing polydiorganosiloxane fluids used in this preferred embodiment are well known in the art. The polydiorganosiloxane fluid is endblocked with vinyldiorganosiloxy groups. The organic radicals can be methyl, ethyl, phenyl, or 3,3,3-trifluoropropyl radicals, there being from 0 to 50 inclusive percent 3,3,3-trifluoropropyl radicals. The phenyl radicals can be present in an amount of from 0 to 10 percent inclusive, all percentages being based on the total number of organic radicals in the polydiorganosiloxane fluid. The vinyldiorganosiloxy groups have organic radicals selected from the same group of organic radicals listed above. The polydiorganosiloxane fluid has a viscosity of 0.2 to 100 Pa.s at 25° C.

The electrically conductive carbonaceous particles used to give the electrically conductive silicone elastomeric mixture its electrical conductivity are selected from a group consisting of carbon and graphite particles having an average particle diameter of less than 20 micrometers. The diameter as herein defined is the diameter of a circle whose area is equal to the projected area of the particle. The particles themselves may be spherical as in the case of carbon black or platelets as in the case of ground synthetic graphite. It is preferable to have the particles with an average diameter of less than 5 micrometers as the smaller diameters make a more uniform mixture. The surface of the cured coating is smoother with the smaller particle size.

The preferred carbon particles are the acetylene carbon blacks as they exhibit a greater degree of electrical conductivity than other types of carbon black. Commercial forms of this carbon black are available.

The preferred graphite particles are those ground to an average diameter of less than 5 micrometers. Both natural and synthetic graphites can be used, but if the preferred platinum catalyzed cure system is used the graphite must be evaluated to verify that impurities present, such as sulphur, do not interfere with the proper cure of the mixture. For this reason the synthetic graphites are preferable.

The polyorganohydrogensiloxanes contaning silicon-bonded hydrogen atoms are also well known in the art such as described by Polmanteer et al. in U.S. Pat. No. 3,697,473 and Lee et al. in the U.S. Pat. No. 3,989,668 which patents are hereby incorporated by reference to show examples of polyorganohydrogensiloxanes known in the art. The polyorganohydrogensiloxanes useful for the present invention can be any siloxane having an average of at least 2.1 silicon-bonded hydrogen atoms per molecule and an average of no more than one silicon-bonded hydrogen atom per silicon atom. The remaining valences of the silicon atoms are satisfied by divalent oxygen atoms or by monovalent hydrocarbon radicals having less than 6 carbon atoms per radical such as methyl, isopropyl, tertiarybutyl and cyclohexyl, and phenyl, and 3,3,3-trifluoropropyl radicals. The polyorganohydrogensiloxanes can be homopolymers, copolymers, and mixtures thereof which contain units of the following types:

R$_2$SiO, R$_3$SiO$_{0.5}$, H(CH$_3$)SiO, H(CH$_3$)$_2$SiO$_{0.5}$, and SiO$_2$ where R is the monovalent hydrocarbon defined above. Some specific examples include polymethylhydrogensiloxane cyclics, copolymers of trimethylsiloxy and methylhydrogensiloxane units, copolymers of dimethylhydrogensiloxy and methylhydrogensiloxane units, copolymers of trimethylsiloxy, dimethylsiloxane, and methylhydrogensiloxane units, and copolymers of dimethylhydrogensiloxy, dimethylsiloxane, and methylhydrogensiloxane units. Preferably, the organohydrogensiloxanes have an average of at least 5 silicon-bonded hydrogen atoms per molecule.

The compositions of the above described preferred type of electrically conductive curable silicone elastomeric mixture of this invention are cured with the aid of a catalyst which can be any of the platinum-containing catalysts that are known to catalyze the reaction of silicone-bonded hydrogen atoms with silicon-bonded vinyl groups and which are soluble in the polydiorganosiloxane fluid. Platinum-containing catalysts which are not soluble in said fluid are not sufficiently effective to provide for the compositions of this invention. A class of platinum-containing catalysts particularly suitable for use in the compositions of this invention are the complexes of chloroplatinic acid described by Willing in U.S. Pat. No. 3,419,593 which is hereby incorporated by reference to show the preparation of said complexes and the complexes per se. A preferred catalyst, described by Willing, is a platinum-containing complex which is the reaction product of chloroplatinic acid and symdivinyltetramethyldisiloxane.

The platinum-containing catalyst is present in an amount sufficient to provide at least one part by weight of platinum for every one million parts by weight of the polydiorganosiloxane fluid. It is to be understood that amounts of platinum greater than the 50 parts per million stated above are also effective in the compositions of the invention but said larger amounts, especially when this preferred catalyst is used, are unnecessary and wasteful.

A mixture of polydiorganosiloxane fluid, polyorganohydrogensiloxane, and platinum catalyst may begin to cure immediately on mixing at room temperature, therefore, it is necessary to inhibit the action of the catalyst at room temperature with a platinum catalyst inhibitor if the composition is to be stored an appreciable time before use.

One type of platinum catalyst inhibitor suitable for use is the acetylenic inhibitors described in the U.S. Pat. No. 3,445,420 to Kookootsedes et al. which is hereby incorporated by reference to show acetylenic inhibitors and their use as inhibitors.

A second type of platinum catalyst inhibitor is the olefinic siloxanes and their use in silicone compositions as platinum catalyst inhibitors. In partricular, olefinic siloxanes having the formula

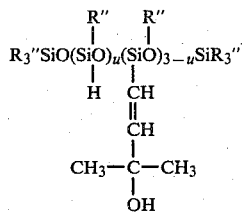

are preferred as the platinum catalyst inhibitor because these olefinic siloxanes inhibit the action of catalyst for more than 24 hours at room temperature. Furthermore, the low volatility of these preferred olefinic siloxanes permits the use of the compositions of this invention in the open without concern for loss of the inhibitor due to evaporation. Each $R''$ in the olefinic siloxanes above can be, independently, methyl, ethyl, phenyl, or 3,3,3-trifluoropropyl and u can be 1 or 2. It is to be understood that mixtures of olefinic siloxanes of the formula shown in which u is 1 and 2 are also operative as platinum catalyst inhibitor in the compositions of this invention.

A third type of platinum catalyst inhibitor suitable for use are the vinylorganocyclosiloxanes of the formula

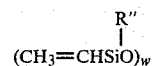

wherein $R''$ is defined above and w has an average value of from 3 to 6. Vinylorganocyclosiloxanes are well known in the organosilicon art, especially where $R''$ is methyl and w is 3, 4, or 5.

The amount of platinum catalyst inhibitor to be used in the compositions of this invention is simply the amount needed to produce the desired shelf life and yet not extend the cure time of the compositions of this invention to an impractical level. This amount will vary widely and will depend upon the particular inhibitor that is used, the nature and concentration of the platinum-containing catalyst and the nature of the polyorganohydrogensiloxane.

Inhibitor added in amounts as small as one mole of inhibitor for every mole of platinum will in some instances cause an inhibition of the catalyst and afford a satisfactory pot life. In other cases, considerably more inhibitor, such as 10, 50, 100, 500 and more moles of inhibitor for every mole of platinum may be needed to achieve the desired combination of pot life and cure time. The exact amount of any particular inhibitor to be used in the compositions of this invention should be determined by simple experimentation.

The inhibiting effect of platinum catalyst inhibitor can be overcome by heating the compositions of this invention to a temperature of 70° C. or higher. The composition of this invention is obtained whenever the recited components are mixed in the proportions necessary to meet the above limits. The order of mixing is not critical, however if the preferred composition is used, it is preferred to have inhibitor present when polydiorganosiloxane fluid, polyorganohydrogensiloxane, and platinum containing catalyst are mixed, since a curing reaction involving these components begins immediately at room temperature if inhibitor is not present.

The best way to prepare the preferred compositions of this invention is to mix the polydiorganosiloxane fluid, carbonaceous particles, platinum containing catalyst, inhibitor, polyorganohydrogensiloxane crosslinker, and graphite fiber in a dough mixer. Each component should be uniformly distributed in the mixture before adding the next. It is particularly important to have the inhibitor well distributed in the mixture before the crosslinker is added, as the curing reaction will begin if this is not done. The graphite fibers are added as the last step of the mixing operation to prevent their being sheared excessively and reduced to lengths below the lower limit of the instant invention.

If the preferred embodiment of this invention is to be used in the manner described below, it is necessary that the viscosity of the composition be low enough to allow pumpability in the equipment being used. In such a method, the viscosity of the final mixture is dependent upon at least the viscosity of the beginning electrically conductive elastomeric mixture, the method of mixing, the amount of graphite fiber added, and the length of the graphite fiber added. The viscosity thus determines the upper limit of the amount of graphite fiber that can be added.

The composition of the preferred embodiment of this invention can be made in a one-package or two-package form. If it is to be stored for any period of time the preferred composition is made as a two-package form. A preferred method is to mix one half of the polydiorganosiloxane fluid, one half of the carbonaceous particles, the platinum-containing catalyst, the inhibitor and one half of the graphite fibers in one package. The other package contains the remainder of the polydiorganosiloxane fluid and carbonaceous particles, the polyorganohydrogensiloxane and the other half of the graphite fibers. The two packages are then mixed together shortly before their use in a one to one ratio by weight. Obviously there are other ways to combine the recited components to prepare the compositions of this embodiment in multi-package form.

The compositions of this embodiment are curable by heating them to a temperature sufficient to cause curing, preferably greater than 100° C., either in a confined area or exposed to the atmosphere.

The compositions of this invention can be formed by well-known molding techniques and cured to electrically conductive silicone elastomers. The compositions of this invention can be further utilized by applying them over any heat-stable base member and curing them to produce an electrically conductive surface. The base member can be a rigid surface such as a glass or plastic article, or a flexible surface such as a fabric or film.

An electrically conductive member of this invention is produced by coating the composition of this invention over non-metallic filaments which may be gathered together as in a roving, yarn, or cord.

The filaments can be any non-metallic filaments capable of withstanding the intended temperatures of manufacture and use. The preferred filaments are those made of glass, aramid fibers, carbon or graphite, and mixtures of such filaments. The filaments of glass or of aramid are electrically non-conductive, while the fibers of carbon or graphite are conductive. The glass filaments can be made electrically conductive by coating their surface with a conductive material such as graphite particles. Such electrically conductive glass filaments are commercially available. The electrical conductivity of a bundle of filaments in the form of a roving, yarn, or cord can be controlled to a desired level by adjusting the ratio of conductive filaments to non-conductive filaments used to make up the bundle of filaments.

Any suitable method may be used to coat the composition of this invention over the filaments or base member. One common method is to disperse the composition in a suitable solvent such as toluene, xylene, or 1,1,1-trichloroethane, then conduct the filaments through a tank filled with the dispersion, through a die to control the amount of coating, and then through an oven to dry and cure the coating. This is normally a continuous operation with several passes through the coating apparatus to build the coating up to the desired thickness in a smooth and uniform manner. The completed electrically conductive member is typically of about 1.6 to 2.5 mm diameter with an electrical resistance of between 2,300 to 10,000 ohms per 30 cm of length. It is apparent that the conductivity of the finished member will be dependent both upon the conductivity of the filaments and the conductivity of the coating applied over the bundle.

One of the advantages of the preferred embodiment of this invention is that it can be used without dispersing in solvent. The viscosity of the composition is low enough that the filaments or base member can be coated using a modified cross head arrangement similar to that customarily used to apply insulation to electrical wires. The filaments are fed through the cross head in a continuous manner while the composition is forced around the filaments and shaped by the cross head and exit die of the cross head. The composition may be fed to the cross head by using pumps or a pressure pot using air pressure as the driving force. Such a coating process is described in the article, "High Temperature Ignition Core Fabrication Using a Liquid Silicone Rubber," published by the Society of Automotive Engineers, Inc. as paper number 770866 at the Passenger Car Meeting in Detroit, Mich. on Sept. 26, 1977. The coated filaments are then cured by passing through a hot air oven. Since no solvent has to be driven off, the energy requirement to produce a finished, cured, electrically conductive member is much less than that required by the previously described method. The use of the preferred composition with this method also results in a process with no volatile by-products that must be properly controlled and disposed of.

An important use of electrically conductive members is as a conductive core in automobile ignition cable. The conductivity of the core is controlled to a level such that the direct current to fire the spark plug will travel through the core, but the high frequency pulses generated by the spark will not travel back through the core. Such high frequency pulses generate radio and television interference if allowed to be radiated by the ignition system.

The conductive core consists of a group of filaments coated with an elastomeric coating to bind them into a compact bundle and to give the core a smooth, non-adhering outer surface. The electrical conductivity of the core is determined by the electrical conductivity of the group of filaments and by the electrical conductivity of the elastomeric coating. The smooth, non-adhering outer surface is necessary so that the covering insulation layer can be easily removed during the installation of terminals during the manufacture of ignition cable.

Previously available electrically conductive elastomeric mixtures were limited in the degree of conductivity they could supply. It was necessary that the filaments used with those electrically conductive elastomeric mixtures also be electrically conductive. The filaments were made conductive by coating the individual filaments with electrically conductive carbon or graphite, or by including electrically conductive carbon or graphite filaments in the group of filaments. Either of these procedures raises the cost of the filaments.

The conductivity of the composition of the instant invention is high enough so that it is not necessary to use electrically conductive filaments. A simple non-conductive group of filaments may be used; the coating alone has sufficient conductivity to yield an electrically conductive member of the desired conductivity.

The following examples are included for illustrative purposes only and should not be construed as limiting the invention which is properly delineated by the appended claims. All parts are parts by weight.

EXAMPLE 1

A series of comparative examples of solvent dispersions of electrically conductive, curable, silicone elastomeric mixtures were prepared and coated on a glass fiber cord to form electrically conductive members of a type used as a core in automotive ignition cable. These represent prior art.

(A) A solvent dispersion of 100 parts of methylphenylvinylsiloxy endblocked polydimethylsiloxane having a viscosity at 25° C. of about 2.1 Pa.s was prepared by mixing with 387 parts of 1,1,1-trichloroethane. After a uniform dispersion was obtained, there was added with additional stirring, 23 parts of electrically conductive acetylene carbon black, 6 parts of trimethylsiloxy endblocked polyorganohydrogensiloxane having an average of five methylhydrogensiloxane units and three dimethylsiloxane units, 0.2 part of a chloroplatinic acid complex of divinyltetramethyldisiloxane diluted with methylphenylvinylsiloxy endblocked polydimethylsiloxane to provide 0.7 weight percent platinum, and 0.025 part of 3-methyl-1-butyn-3-ol.

The solvent dispersion was coated on a non-conductive glass fiber cord manufactured by Owens Corning Corporation and being designated as "3U". This cord has an average diameter of 1.25 mm. The cord was coated by passing it through a bath of the solvent dispersion and then a die to give a uniform build up. It was cured for 1.5 minutes at 200° C. The procedure was repeated for 5 passes to give a final coated average diameter of 1.55 mm.

The coated glass fiber cord was then used as the core for an automotive ignition cable produced by extruding a commercial insulating silicone rubber over the coated glass fiber cord to an outer diameter of 7 mm and curing with a hot air vulcanizing unit to give an ignition cable.

The ignition cable was made into test pieces by attaching a standard spark plug terminal to one end and a standard distributor terminal to the other end. The effective length of the cable was 50.8 mm (2 inches) with the terminals being attached through the customary "strip and fold" technique.

(B) A solvent dispersion of 100 parts of polydiorganosiloxane gum, having a Williams plasticity of 150 mm, having, as a percentage of all organic radicals in the gum, 99.848 methyl radicals and 0.152 vinyl radicals was prepared by mixing with 1348 parts of 1,1,1-trichloroethane. After a uniform dispersion was obtained, there was added with additional stirring 50 parts of the carbon black of (A), 5 parts of the polyorganohydrogensiloxane of (A), 0.25 part of the platinum containing catalyst of (A), and 0.1 part of 3-methyl-1-butyn-3-ol. Core samples were prepared from the dispersion using the cord and procedures of (A). The core was made into ignition cable and test pieces were constructed using the procedure described in (A).

(C) A solvent dispersion identical to that of (A) was prepared with the exception that 34 parts of carbon black were used along with 420 parts of 1,1,1-trichloroethane. Core samples were prepared from the dispersion using the cord and procedures of (A). The core was made into ignition cable and test pieces were constructed using the procedure described in (A).

EXAMPLE 2

A series of compositions of this invention were prepared for use in making test pieces to compare to the prior art test pieces of Example 1.

(D) A silicone elastomeric mixture was prepared by mixing in a dough mixer 100 parts of the polydimethylsiloxane of Example 1, (A); 9 parts of a benzene soluble organopolysiloxane hydrolysate having 37.5 mole percent phenylsilsequioxane units, 30 mole percent dimethylsiloxane units, 20 mole percent methylvinylsiloxane units, 7.5 mole percent methylsilsequioxane units, and 5 mole percent trimethylsiloxy units with a phenyl content of about 29.9 weight percent and a vinyl content of about 5.5 weight percent; 8 parts of a trimethylsiloxy endblocked polymethylphenylsiloxane fluid having 42.8 weight percent phenyl radicals, and a viscosity of 0.5 Pa.s at 25° C.; 27 parts of the acetylene carbon black of Example 1, (A); 6.5 parts of the polyorganohydrogensiloxane of Example 1, (A); 0.312 part of the platinum-containing catalyst of Example 1, (A); and 0.025 part of 3-methyl-1-butyn-3-ol.

To the above mixture, there was mixed in 0.5 weight percent based on the weight of the mixture of graphite fiber. The graphite fiber was type AS, produced by Hercules Incorporated, and chopped to an average length of 3.2 mm. The final composition was of a flowable viscosity.

Since the compositions of this invention, as demonstrated by this Example, do not require the presence of solvent, the composition prepared above was coated on the glass fiber cord of Example 1, (A) by using a low pressure extrusion device to enclose or surround the glass fiber cord with a continuous layer of the composition. The coating was cured by heating for 0.5 minutes at 300° C. in a hot-air oven. The outer diameter of the cured, coated cord was 1.88 mm.

The cured coated cord was then used as the core for an automotive ignition cable produced using the procedures in Example 1, (A). The cable was then made into test pieces using the same procedure as described in Example 1, (A).

(E) A silicone elastomeric mixture was prepared by mixing 95 parts of the polydimethylsiloxane of Example 1, (A); 5 parts of methylphenylvinylsiloxy endblocked polydiorganosiloxane copolymer of dimethylsiloxy units and phenylmethylsiloxy units having about 25 weight percent phenyl radicals and a viscosity of about 2 Pa.s; 9 parts of the benzene soluble organopolysiloxane hydrolysate of Example 2, (D); 50 parts of the polymethylphenylsiloxane fluid of Example 2, (D); 34 parts of the acetylene carbon black of Example 1, (A); 6.5 parts of the polyorganohydrogensiloxane of Example 1, (A); 0.4 part of the platinum-containing catalyst of Example 1, (A); and 0.025 part of 3-methyl-1-butyn-3-ol.

To the above mixture, there was added 0.6 weight percent of the graphite fiber of Example 2, (D), based on the weight of the mixture. This composition was then extruded onto the glass cord and cured, following the procedure of Example 2, (D). The cured coated cord was then made into cable and then into test pieces following the same procedure as described in Example 1, (A).

(F) A composition identical to that of (E) was prepared except the amount of polymethylphenylsiloxane fluid used was 75 parts and the amount of acetylene carbon black used was 38 parts.

The electrical resistance of test pieces from each of the runs described above was measured with an ordinary ohmmeter. Table I gives the results of the measurements. Also listed is the weight percent, on a solids basis, of the conductive materials present in each composition. A comparison of the resistance of the cables containing graphite fibers shows that the addition of a minor amount of fiber to an already electrically conductive mixture causes an unexpected drop in the resistance. The resistance is dependent upon the amounts of both the carbon black present and the graphite fiber present. The lower the resistance of a sample is, the higher the electrical conductivity.

TABLE 1

| Sample | Conductive Material* | | Resistance ohms/ 50.8 mm |
|---|---|---|---|
| | carbon black | graphite fiber | |
| (A)** | 17.8 | — | 4000 |
| (B)** | 32.2 | — | 1900 |
| (C)** | 24.2 | — | 3000 |
| (D) | 17.9 | 0.5 | 3000 |
| (E) | 17.0 | 0.6 | 550 |
| (F) | 16.6 | 0.6 | 320 |

*weight percent, on solids basis, in composition
**comparative examples

EXAMPLE 3

A series of compositions were made to demonstrate the effect of the length of the graphite fiber used.

A two part silicone elastomeric mixture was prepared by mixing 100 parts of the polydimethylsiloxane of Example 1, (A); 21 parts of acetylene carbon black; 0.40 parts of the platinum catalyst of Example 1, (A); and 0.06 part of 3-methyl-1-butyn-3-ol to yield part A. Part B was prepared by mixing 100 parts of the polydimethylsiloxane; 23 parts of the acetylene carbon black; and 10 parts of the polyorganohydrogensiloxane of Example 1, (A).

Hercules, type AS, graphite fibers chopped to the various average lengths shown in Table II were mixed into portions of a mixture of 50% by weight part A and 50 percent by weight part B. The amount of graphite fiber added is shown in Table II. Each composition was molded into a slab and cured 10 minutes at 150° C. Samples of each cured slab were then evaluated by measuring its volume resistivity. The results are shown in Table II.

TABLE II

| Graphite Fiber | | Volume Resistivity ohm-cm |
|---|---|---|
| Weight Percent Added | Length mm | |
| 0.5 | 6.4 | 2.65 |
| 1.0 | 6.4 | 1.60 |
| 1.0 | 3.2 | 2.17 |
| 1.0 | 1.0 | 21.00 |
| 2.5 | 1.0 | 15.00 |
| 10.0 | 1.0 | 2.06 |
| 0.0 | — | 23.1 |

It can be seen that at a given level of addition of the graphite fiber, for instance 1%, as the length of the fiber is decreased, the volume resistivity increases. At a given length of graphite fiber, for instance 1 mm, as the amount of fiber added is increased, the volume resistivity decreases.

The composition containing 10 weight percent of graphite fiber added with an average length of 1 mm has a volume resistivity in an acceptable range, but the cost of the composition would be excessive. It would be more economical to use less of a longer fiber.

EXAMPLE 4

The composition of Example 3 containing 1 weight percent of 3.2 mm long graphite fiber was coated on aramid fiber cord (Kevlar®) in the same manner as described in Example 2. The coated cord, originally non-conductive, had a resistance of 13,000 ohms per 30 cm.

That which is claimed is:

1. A base member coated with a silicone composition curable to an electrically conductive silicone elastomer and cured, said composition comprising a product obtained by mixing
   (A) an electrically conductive curable silicone elastomeric mixture having a viscosity below 1,000 Pa.s at 25° C. and
   (B) graphite fibers with an average length of from about 1 mm to about 6 mm, the graphite fibers being present in an amount of from 0.3% to 5.0% by weight based on the weight of the composition.

2. The base member of claim 1 in which the electrically conductive curable silicone elastomeric mixture (A) comprises
   (i) 100 parts by weight of a vinyldiorganosiloxy endblocked polydiorganosiloxane fluid wherein each organic radical is selected from a group consisting of methyl, ethyl, phenyl, and 3,3,3-trifluoropropyl radicals, there being from 0 to 50 inclusive percent 3,3,3-trifluoropropyl radicals and from 0 to 10 inclusive percent phenyl radicals both based on the total number of organic radicals in the polydiorganosiloxane fluid, the fluid having a viscosity of from 0.2 to 100 Pa.s measured at 25° C.,
   (ii) from 15 to 60 parts by weight of electrically conductive carbonaceous particles selected from a group consisting of carbon and graphite particles having an average particle diameter of less than 20 micrometers,
   (iii) a polyorganohydrogensiloxane having an average of at least 2.1 silicon-bonded hydrogen atoms per molecule, said molecules consisting essentially of units selected from the group consisting of H(CH$_3$)SiO units, R$_2$SiO units, H(CH$_3$)$_2$SiO$_{\frac{1}{2}}$ units, R$_3$SiO$_{\frac{1}{2}}$ units, and SiO$_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the polydiorganosiloxane fluid (i),
   (iv) a platinum catalyst, soluble in (i) and present in an amount sufficient to provide at least 1 part by weight of platinum for every one million parts by weight of the polyiorganosiloxane fluid (i), and
   (v) an amount of a platinum catalyst inhibitor sufficient to give the desired shelf life after mixing.

3. A filament coated with a silicone composition curable to an electrically conductive silicone elastomer and cured, said composition comprising a product obtained by mixing
   (A) an electrically conductive curable silicone elastomeric mixture having a viscosity below 1,000 Pa.s at 25° C. and
   (B) graphite fibers with an average length of from about 1 mm to about 6 mm, the graphite fibers being present in an amount of from 0.3% to 5.0% by weight based on the weight of the composition.

4. The filament of claim 3 in which the electrically conductive curable silcone elastomeric mixture (A) comprises
   (i) 100 parts by weight of a vinyldiorganosiloxy endblocked polydiorganosiloxane fluid wherein each organic radical is selected from a group consisting of methyl, ethyl, phenyl, and 3,3,3-trifluoropropyl radicals, there being from 0 to 50 inclusive percent 3,3,3-trifluoropropyl radicals and from 0 to 10 inclusive percent phenyl radicals both based on the total number of organic radicals in the polydiorganosiloxane fluid, the fluid having a viscosity of from 0.2 to 100 Pa.s measured at 25° C., (ii) from 15 to 60 parts by weight of electrically conductive carbonaceous particles selected from a group consisting of carbon and grahite particles having an average particle diameter of less than 20 micrometers, (iii) a polyorganohydrogensiloxane having an average of at least 2.1 silicon-bonded hydrogen atoms per molecule, said molecules consisting essentially of units selected from the group consisting of $H(CH_3)SiO$ units, $R_2SiO$ units, $H(CH_3)_2SiO_{\frac{1}{2}}$ units, $R_3SiO_{\frac{1}{2}}$ units, and $SiO_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the polydiorganosiloxane fluid (i), (iv) a platinum catalyst, soluble in (i) and present in an amount sufficient to provide at least 1 part by weight of platinum for every one million parts by weight of the polydiorganosiloxane fluid (i), and (v) an amount of platinum catalyst inhibitor sufficient to give the desired shelf life after mixing.

5. An electrically conductive member comprising a plurality of filaments coated with a cured composition, said composition comprising a product obtained by mixing (A) an electrically conductive curable silicone elastomeric mixture having a viscosity below 1,000 Pa.s at 25° C. and (B) graphite fibers with an average length of from about 1 mm to about 6 mm, the graphite fibers being present in an amount of from 0.3% to 5.0% by weight based on the weight of the composition to provide an electrically conductive silicone elastomeric surface encircling the plurality of filaments.

6. The electrically conductive member of claim 5 in which the electrically conductive curable silicone elastomeric mixture (A) comprises (i) 100 parts by weight of a vinyldiorganosiloxy endblocked polydiorganosiloxane fluid wherein each organic radical is selected from a group consisting of methyl, ethyl, phenyl, and 3,3,3-trifluoropropyl radicals, there being from 0 to 50 inclusive percent 3,3,3-trifluoropropyl radicals and from 0 to 10 inclusive percent phenyl radicals both based on the total number of organic radicals in the polydiorganosiloxane fluid, the fluid having a viscosity of from 0.2 to 100 Pa.s measured at 25° C., (ii) from 15 to 60 parts by weight of electrically conductive carbonaceous particles selected from a group consisting of carbon and graphite particles having an average particle diameter of less than 20 micrometers, (iii) a polyorganohydrogensiloxane having an average of at least 2.1 silicon-bonded hydrogen atoms per molecule, said molecules consisting essentially of units selected from the group consisting of $H(CH_3)SiO$ units, $R_2SiO$ units, $H(CH_3)_2SiO_{\frac{1}{2}}$ units, $R_3SiO_{\frac{1}{2}}$ units, and $SiO_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the polydiorganosiloxane fluid (i), (iv) a platinum catalyst, soluble in (i) and present in an amount sufficient to provide at least 1 part by weight of platinum for every one million parts by weight of the polydiorganosiloxane fluid (i), and (v) an amount of a platinum catalyst inhibitor sufficient to give the desired shelf life after mixing.

* * * * *

UNITED STATES PATENT AND TRADEMARK OFFICE
CERTIFICATE OF CORRECTION

PATENT NO. : 4,303,735
DATED : December 1, 1981
INVENTOR(S) : Gerald R. Kehrer and William G. Smith It is certified that error appears in the above—identified patent and that said Letters Patent is hereby corrected as shown below:

Column 1, line 41 - the word "for" should read "of"

Column 2, line 53 - the word "or" should read "of"

Column 12, line 47 - the word "polyiorganosiloxane" should read "polydiorganosiloxane"

Signed and Sealed this

First Day of June 1982

[SEAL]

Attest:

GERALD J. MOSSINGHOFF

Attesting Officer     Commissioner of Patents and Trademarks